United States Patent [19]
Malley

[11] Patent Number: 5,703,609
[45] Date of Patent: Dec. 30, 1997

[54] EMULATION OF SINGLE LINE DISPLAY WITH MULTI-LINE DISPLAY DRIVER

[75] Inventor: Michael Timothy Malley, LeRoy, N.Y.

[73] Assignee: Eastman Kodak Company, Rochester, N.Y.

[21] Appl. No.: 418,395

[22] Filed: Mar. 10, 1995

[51] Int. Cl.$^6$ .................................................. G09G 3/20
[52] U.S. Cl. ................................................. 345/56; 345/61
[58] Field of Search ................................ 345/56, 61, 112, 345/121, 123, 141

[56] References Cited

U.S. PATENT DOCUMENTS

| | | | |
|---|---|---|---|
| 3,976,995 | 8/1976 | Sebestyen | 340/337 |
| 4,398,819 | 8/1983 | Schron | 355/14 R |
| 4,660,032 | 4/1987 | Tsunoda | 340/825.44 |
| 4,803,478 | 2/1989 | Olsen | 340/726 |
| 4,888,610 | 12/1989 | Tsujimoto et al. | 354/475 |
| 5,229,759 | 7/1993 | Wong | 340/726 |
| 5,285,493 | 2/1994 | Wagai et al. | 379/58 |

OTHER PUBLICATIONS

"HD44780U Dot-Matrix Liquid Crystal Display Controller/Driver", Dec. 1992, Hitachi, Ltd. pp. 1–59.

*Primary Examiner*—Regina D. Liang
*Attorney, Agent, or Firm*—Heslin & Rothenberg, P.C.

[57] ABSTRACT

A single-line 16 character display is driven using a display driver designed to drive two independent 8 character single-line displays. Conceptually, the 16 character display is treated as the two independent 8 character displays placed side by side. The message for display is placed in a first area of driver memory corresponding to the first 8 character display. A truncated version of the same message for display, with an offset at the beginning equal to the number of characters in the first display line, is stored in a second area of driver memory corresponding to the second 8 character display line. When the message and the truncated version thereof are simultaneously displayed, an observer views a single, coherent 16 character single line display. If the message is greater than 16 characters, the driver scrolls both the message for display and the truncated version thereof, creating a single scrolled message from the point of view of the observer.

16 Claims, 9 Drawing Sheets

EMULATION OF SINGLE LINE DISPLAY WITH MULTI-LINE DISPLAY DRIVER

BACKGROUND OF THE INVENTION

1. Technical Field

The present invention generally relates to multi-character displays. More particularly, the present invention relates to emulating a single line display of a predetermined length with a display driver designed to drive at least two independent single line displays.

2. Background Information

In the past, in order to utilize a multi-character display of greater than 8 characters, it was necessary to use an expensive display driver compared to display drivers for driving 8 character displays. Some inexpensive 8 character display drivers include the ability to drive two or more independent 8 character displays. Therefore, it has not been economical to include multi-character displays of greater than 8 characters where component cost is the overriding factor in product design.

Such a situation exists in the camera industry today. The camera industry is primarily cost driven, with the focus placed on maximizing the potential of the least-cost components. With the introduction of cameras including displays for displaying messages to the user, the camera industry has been stunted in the length of messages that are able to be displayed, since the least-cost display driver is able to display, at best, multiple independent lines of 8 characters in length. It would be helpful if these least-cost components could be used, in order to contain the cost of camera elements, while still providing a display of greater than 8 characters.

Thus, a need exists for a way to use conventional and inexpensive display drivers for driving multiple independent display lines to drive a display line of greater than 8 characters.

SUMMARY OF THE INVENTION

Briefly, the present invention satisfies the need for a way to use a conventional display driver for displaying multiple independent 8 character display lines to drive a single-line display of greater than 8 characters by conceptually placing the multiple 8 character display lines side by side to form a single display line of greater than 8 characters.

In accordance with the above, it is an object of the present invention to provide a single multi-character display line of greater than 8 characters.

It is another object of the present invention to provide a single line multi-character display of greater than 8 characters using an inexpensive, conventional display driver for driving a multiple line character display of 8 characters or less per line.

The present invention provides, in a first aspect, a method for emulating a single line display of a predetermined length with a display driver for driving at least two independent single line displays, the display driver including a memory for storing at least two messages for display on the independent single line displays, each of the independent single line displays having a length less than the predetermined length. The method comprises steps of: providing a single line display of the predetermined length; storing a message for display in the memory; displaying a first portion of the message in a first part of the single line display; and displaying a second portion of the message in a second part of the single line display adjacent the first part, the display driver driving the single line display. Where the message for display is longer than the predetermined length of the display, the step of storing may comprise steps of: storing the message for display in a first area of memory; and storing a truncated version of the message in a second area of memory, the truncated version having an offset at the beginning thereof equal to a length of the first part of the single line display, the step of displaying the first portion comprising displaying as much of the message stored in the first area of memory as will fit in the first part of the single line display, and the step of displaying the second portion comprising displaying as much of the truncated version of the message stored in the second area of memory as will fit in the second part of the single line display. Where the method includes these two steps of storing, the method may also comprise steps of: scrolling, in the first part of the display, the message stored in the first area of memory; and scrolling, in the second part of the display, the truncated version of the message stored in the second area of memory.

The present invention provides, in a second aspect, apparatus for emulating a single line display of a predetermined length. The apparatus comprises a single line display of the predetermined length; and a display driver for driving at least two independent single line displays, each of the single line displays having a length less than the predetermined length. The display driver comprises: a memory for storing at least two messages for display; means for storing a message for display in the memory; means for causing the single line display to display a first portion of the message in a first part thereof; and means for causing the single line display to display a second portion of the message in a second part thereof. Where the message for display has a length longer than the predetermined length, the memory may comprise a first area and a second area, the means for storing comprising means for storing the message in the first area and means for storing a truncated version of the message in the second area, the truncated version having an offset at the beginning thereof equal to a length of the first part, the means for displaying the first portion comprising means for displaying as much of the message for display stored in the first area of memory as will fit in the first part, and the means for displaying the second portion comprising means for displaying as much of the truncated version of the message stored in the second area of memory as will fit in the second part of the display. The apparatus may further comprise: means for scrolling, in the first part of the display, the message stored in the first area of memory; and means for scrolling, in the second part of the display, the truncated version of the message stored in the second area of memory.

These, and other objects, features and advantages of this invention will become apparent from the following detailed description of the various aspects of the invention taken in conjunction with the accompanying drawings.

BEST MODE FOR CARRYING OUT THE INVENTION

The present invention provides method and apparatus for emulating a single line display of a predetermined length using a display driver designed to drive at least two independent single line displays shorter in length than the predetermined length. Conceptually, the invention puts the two shorter displays side-by-side to form one larger display, with the driver causing a first part of the message to be displayed in a first part of the larger display as if it were the first smaller display, and a second portion of the message to be displayed in a second part of the larger display as if it were the second smaller display. In addition, if the message to be displayed is longer than the large display, then the message is scrolled.

Figure 1:
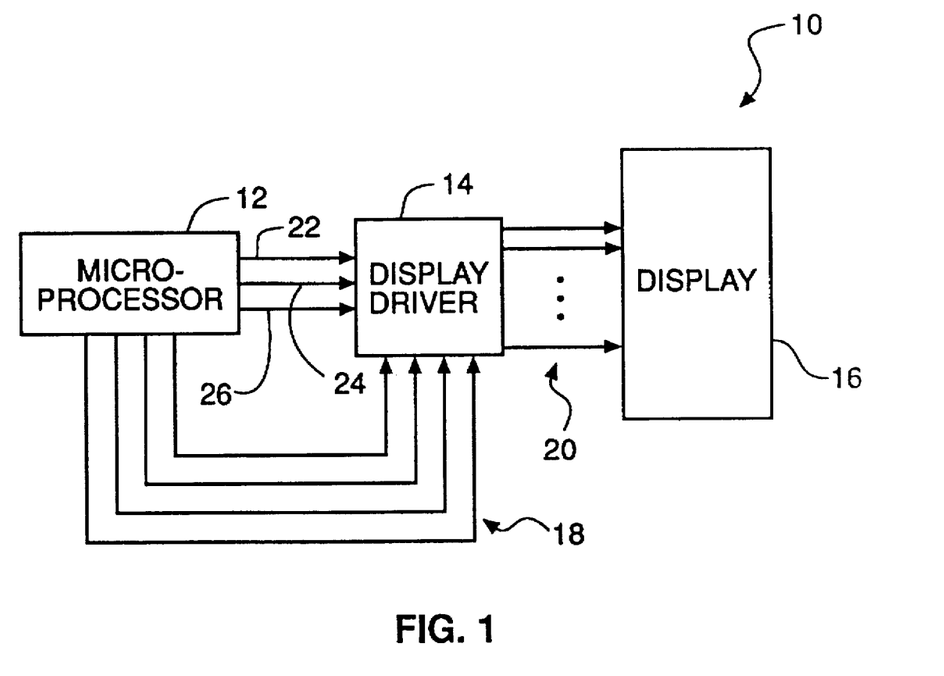
FIG. 1 depicts apparatus for displaying a message, including a microprocessor, a display driver and a multi-character display.

FIG. 1 depicts display apparatus 10 for displaying a message. Display apparatus 10 comprises microprocessor 12, display driver 14 and display 16. Microprocessor 12 and display driver 14 are connected via data lines 18, and display driver 14 and display 16 are connected via display lines 20. Between microprocessor 12 and display driver 14 are also a data/instruction indicator line 22, a read/write line 24 and a clock line 26.

The general operation of display apparatus 10 will now be described. Lines 22, 24 and 26 between microprocessor 12 and display driver 14 are hand shaking lines allowing microprocessor 12 to send data or instructions over data lines 18 to display driver 14. One example of a commercially available display driver useful with the present invention is model HD44780U by Hitachi, Ltd., the manual for which, entitled "Dot-Matrix Liquid Crystal Display Controller/Driver," 1992, is herein incorporated by reference in its entirety. It will be understood that although only four data lines 18 are shown, there could be more or less data lines. It will further be understood that display apparatus 10, as described herein, is exemplary. Since data lines 18 comprise four lines, if a character to be displayed comprises more than four bits, multiple data transfers would need to take place between microprocessor 12 and display driver 14 to effect display of that character. Display 16 may be, for example, a 5×8 dot matrix liquid crystal display. Data/instruction indicator line 22 carries a signal from microprocessor 12 to display driver 14 indicating whether the information to come over data lines 18 is data or an instruction, depending on whether the signal is low or high. For example, a low signal may indicate an instruction, and a high signal may indicate data. Read/write line 24 carries a signal from microprocessor 12 to display driver 14 indicating whether the microprocessor will be writing to the display driver or whether it will be reading from the display driver. For example, a low signal may indicate a read, and a high signal may indicate a write. Clock line 26 carries a clock signal from microprocessor 12 to display driver 14.

An example of the operation of display apparatus 10 to display a character will now be described. Typically, display 16 would initially be cleared, however, this is optional. To clear the display, data/instruction indicator line 22 would carry a low signal, read/write line 24 would carry a high signal, clock line 26 would carry a clock signal and data lines 18 would carry the clear display instruction. If the instruction is more than four bits, this would require more than one transmission. After clearing the display, an instruction to write to a particular RAM location in display driver 14, for example, RAM location 0 would be sent. The instruction would be sent over data lines 18, along with a low signal on data/instruction indicator line 22, a high signal on read/write line 24 and a clock signal on clock line 26. The data for the character to be written is then sent from microprocessor 12 to display driver 14 in a similar manner, the character data being written to RAM location 0. If the RAM location written to corresponds to a display position (i.e., if it is within the display window) in display 16, then the character written is preferably displayed automatically, however, some drivers may require a display instruction. For multiple character display messages, an instruction may be sent to display driver 14 causing auto incrementing of the RAM location to be written to. However, the auto increment feature is optional, since the addresses to be written could continue to be sent. After the auto increment instruction, data for the next character to be written could be sent from microprocessor 12 to display driver 14, and continue in this manner until all of the characters of the message have been sent. In addition, display driver 14 preferably has the capability of scrolling the message for display in display 16. This would be accomplished by a scrolling instruction or a series of shift instructions, depending on the display driver used, being sent from microprocessor 12 to display driver 14.

Figure 2:
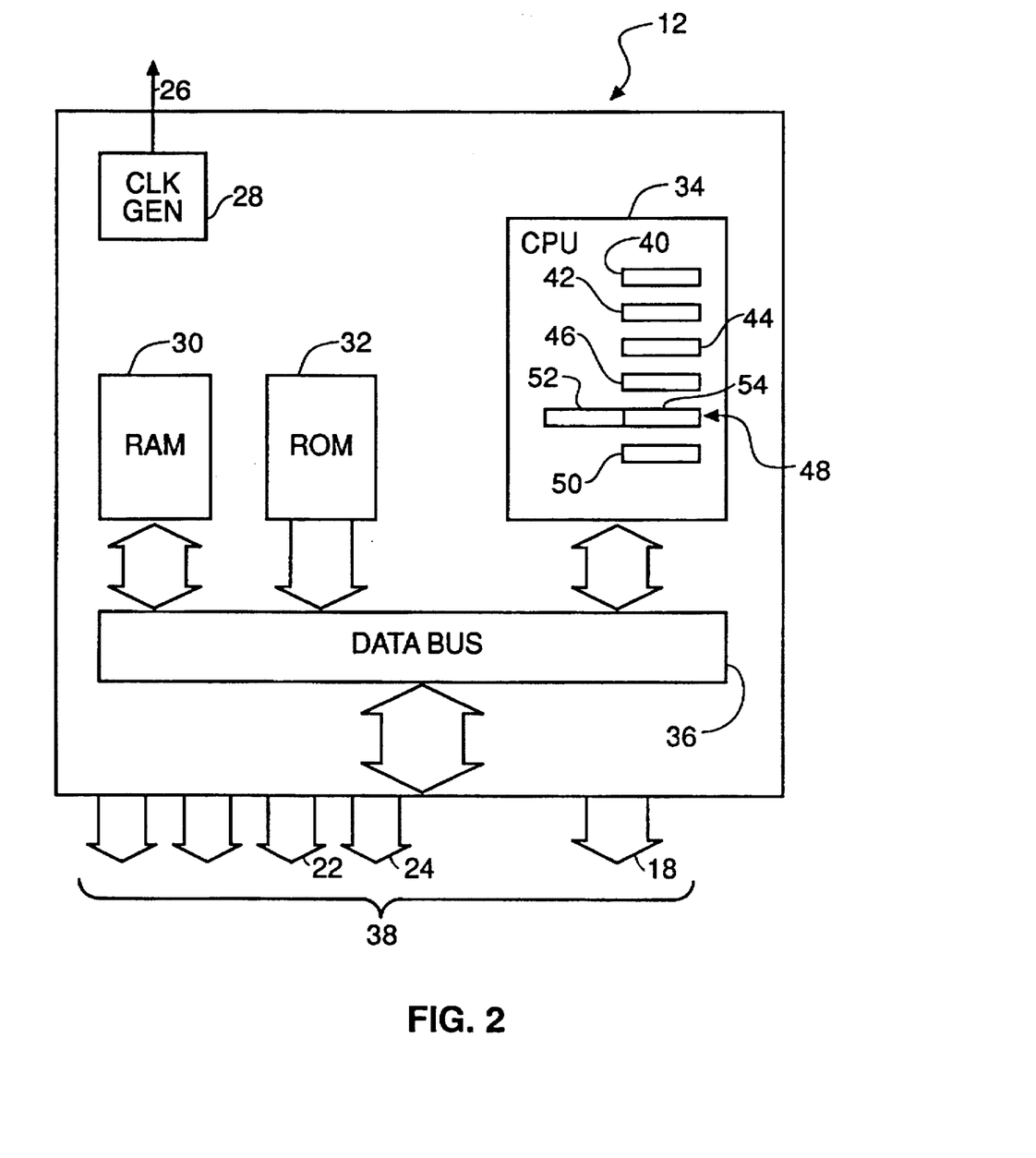
FIG. 2 depicts a more detailed block diagram of the microprocessor of FIG. 1.

FIG. 2 depicts a more detailed block diagram of microprocessor 12. The structure of microprocessor 12 is that of a conventional general purpose 8 bit microprocessor. It will be understood, however, that other types of 8 bit microprocessors could be used with the present invention. Microprocessor 12 comprises clock generation circuit 28, random access memory (RAM) 30, read only memory (ROM) 32, central processing unit (CPU) 34, data bus 36 and I/O ports 38. Clock generation circuit 28 provides the clock signal to display driver 14 over line 26. RAM 30 comprises a plurality of 8 bit registers, and holds the 16 bit address of the message for display. ROM 32 also comprises a plurality of 8 bit registers, and holds the instructions for the operation of camera 46 (see FIG. 4), as well as the message for display. Data bus 36 allows for the exchange of data between RAM 30, ROM 32, CPU 34 and I/O ports 38. CPU 34 comprises accumulator 40, index register 42, index register 44, stack pointer 46, program counter 48 and status register 50. Each of accumulator 40, index registers 42 and 44, stack pointer 46 and status register 50 comprises an 8 bit register. Program counter 48 comprises two 8 bit registers 52 and 54. Accumulator 40 is generally used for arithmetic operations, data transfer, temporary saving and condition decisions. Index registers 42 and 44 are used in addressing, where the actual address is the sum of the contents of the specified address and the contents of the specified index register. Index registers 42 and 44 may also serve other functions. Stack pointer 46 is used for subroutine calls and interrupts. When a program branches out from its presently executing routine to a subroutine or a interrupt routine, the return address is stored in stack pointer 46. The "stack" is normally located in RAM 30. Program counter 48 is a 16 bit counter specifying the address of an instruction that is to be executed next. Status register 50 consists of flags that maintain the status immediately after computation. The status register may contain such flags as a carry flag, a zero flag, an interrupt flag, an overflow flag, a negative flag, a break flag, as well as other status flags. One skilled in the art will understand the general operations of microprocessor 12.

Figure 3:
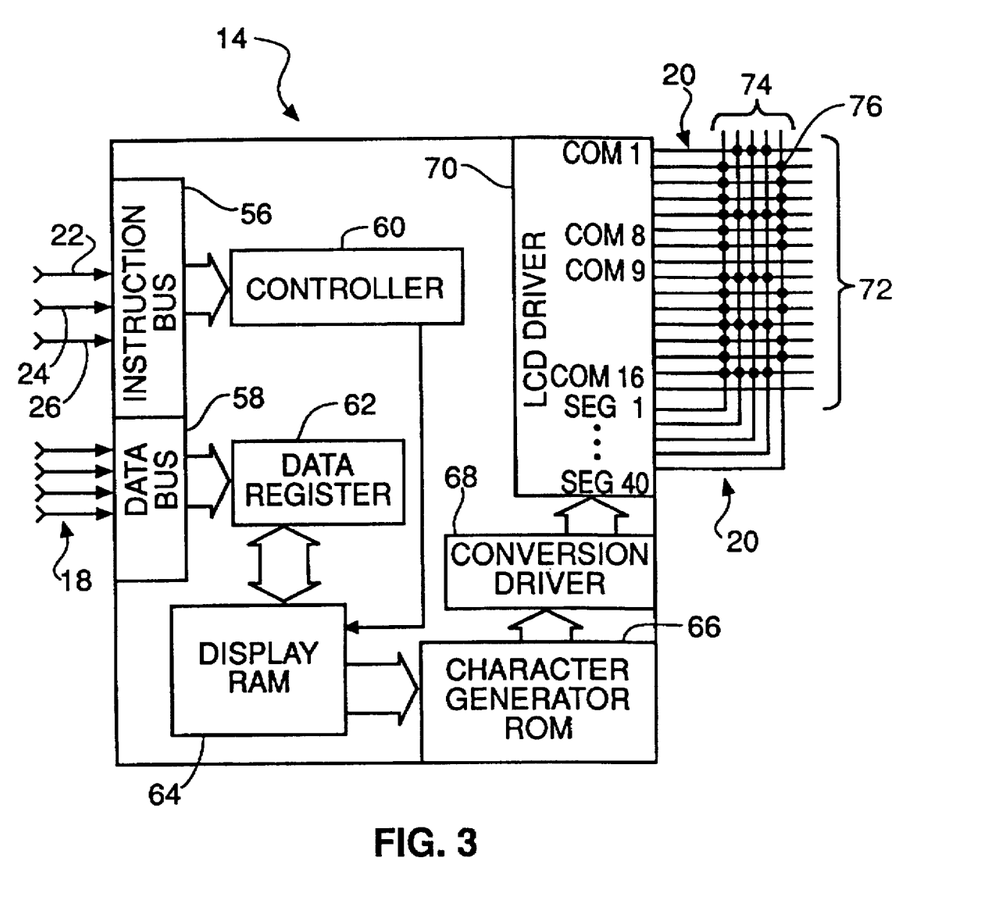
FIG. 3 depicts a more detailed block diagram of the display driver of FIG. 1.

FIG. 3 is a more detailed block diagram of the display driver 14 of FIG. 1. Display driver 14 comprises instruction bus 56, data bus 58, controller 60, data register 62, display RAM 64, character generator ROM 66, conversion driver 68, and LCD driver 70. Instruction bus 56 receives control signals from microprocessor 12 over lines 22, 24 and 26 and provides them to controller 60. Controller 60 serves the functions of an instruction decoder and an address counter. Data register 62 temporarily stores data received over data lines 18 to be written into display RAM 64. Display RAM 64 stores display data represented in 8 bit character codes, with the addresses for storage being generated by controller 60. Character generator ROM 66 generates 5×8 dot character patterns from the 8 bit character codes stored in display RAM 64. Conversion driver 68 converts the character patterns of character generator ROM 66 from parallel to serial for use by LCD driver 70. LCD driver 70 comprises 16 common signal driver lines 72 and 40 segment signal driver lines 74. When a common signal driver line and a segment signal driver line both have active signals on them, their intersection will produce an illuminated dot, such as dot 76.

Figure 4:
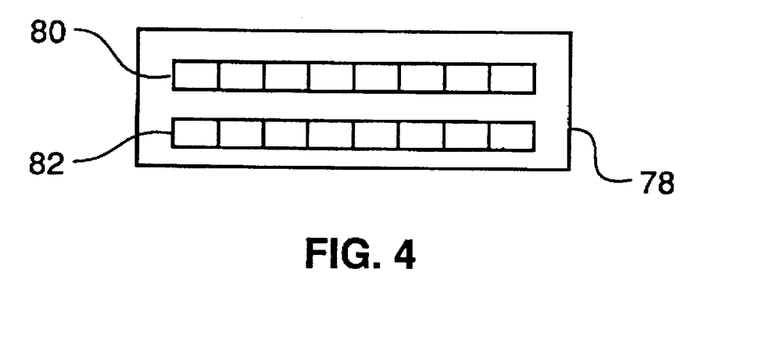
FIG. 4 depicts a two-line display with eight characters per line.

FIG. 4 depicts a two-line display 78, comprising display line 80 and display line 82. Each of display lines 80 and 82 is capable of displaying eight characters. Assume that display lines 80 and 82 operate independent of one another, i.e., line 82 is not meant to be a natural extension of line 80. Assume also that display driver 14 is designed to drive two independent eight character displays, such as display lines 80 and 82 in two-line display 78. Display 78 could be, for example, a liquid crystal display (LCD).

Figure 5:
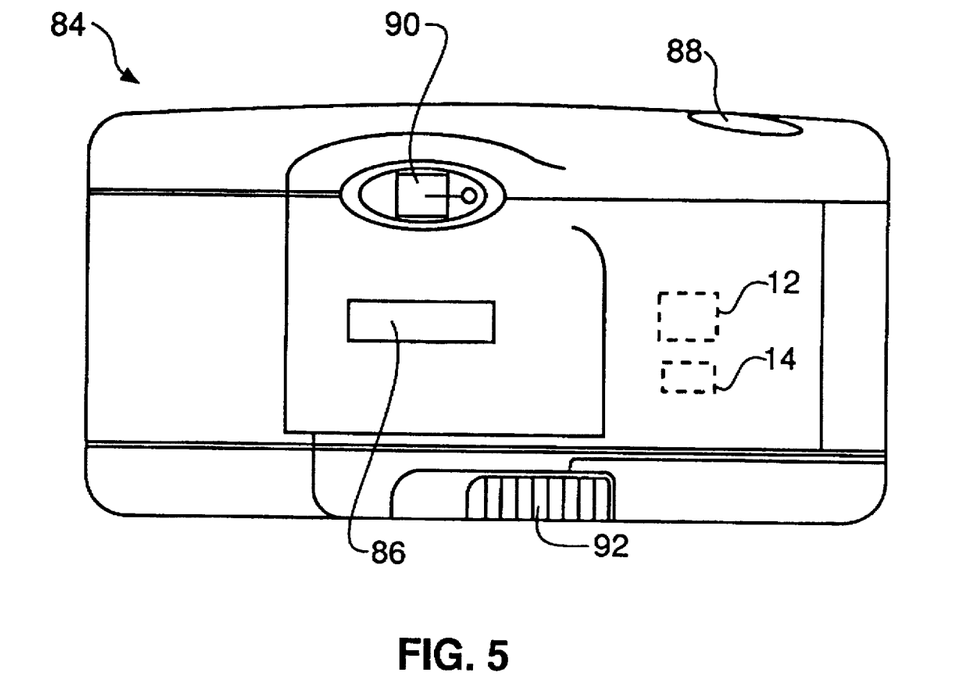
FIG. 5 depicts a camera with a single line display of 16 characters, according to the present invention.

FIG. 5 is a back view of a camera 84 according to the present invention. Camera 84 comprises microprocessor 12 and display driver 14 of FIG. 1, 16 character display 86, shutter-release button 88, view finder 90 and film door latch 92. Sixteen character display 86, operated by microprocessor 12 and display driver 14, displays messages to a user (not shown) regarding various aspects of the operation of camera 84, as well as other messages. 16 character display 86 can be thought of as display lines 80 and 82 of FIG. 4 placed side-by-side to form a single 16 character display line. However, it will be understood that there is no physical delineation between the side-by-side display lines. This description is conceptual only, since the user actually sees a physical 16 character display 86. As an example, if camera 84 includes the capability to determine whether the subject to be photographed is too close, one message might be "subject to close". However, such a message would not fit in 16 character display 86, since there are more then 16 characters, including blanks. Thus, the present invention scrolls the message across 16 character display 86, for example, from right to left, so that the user is able to view the entire message.

Figure 6:
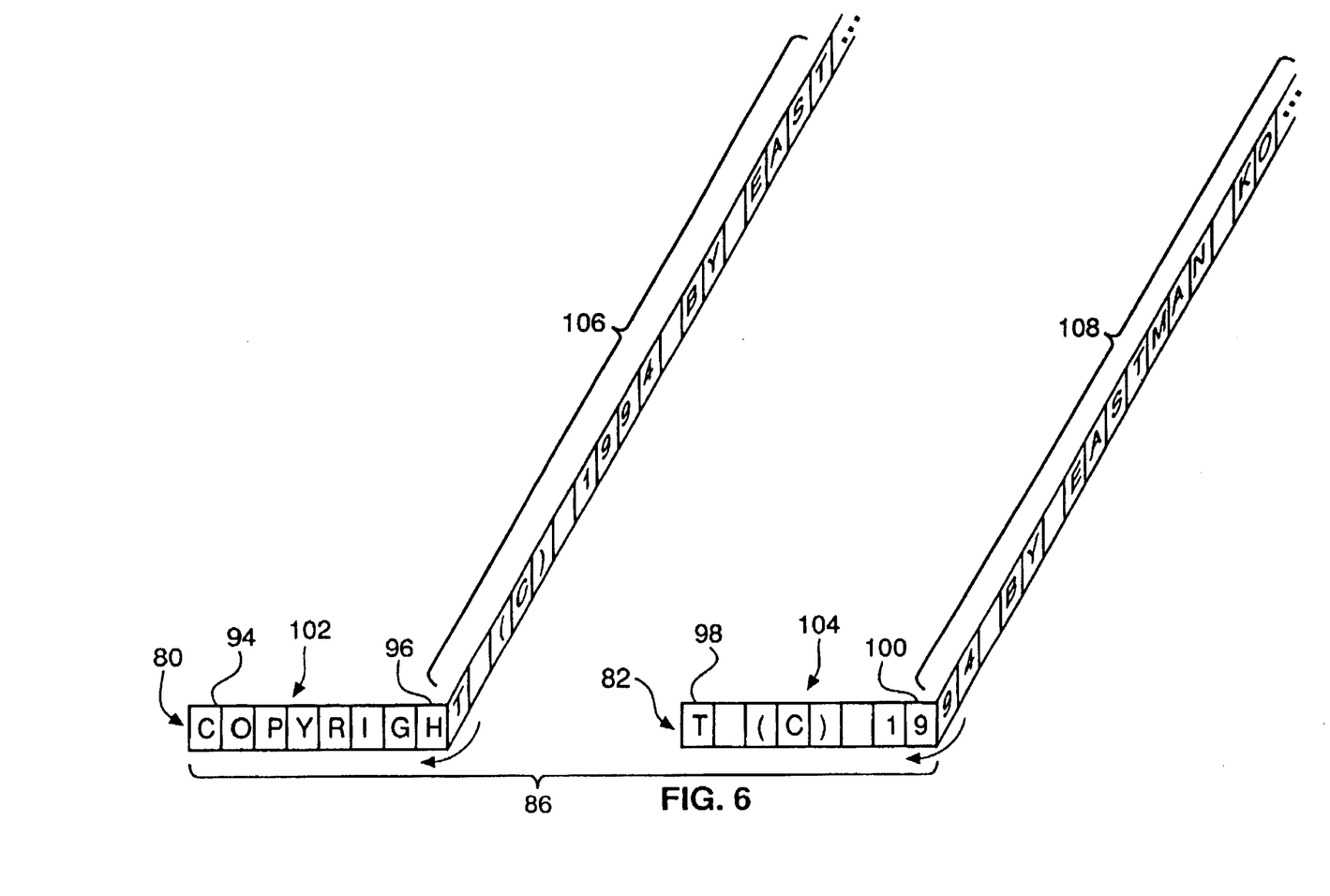
FIG. 6 is a conceptual drawing of the display of FIG. 4 used to emulate the display in the camera of FIG. 5.
Figure 7:
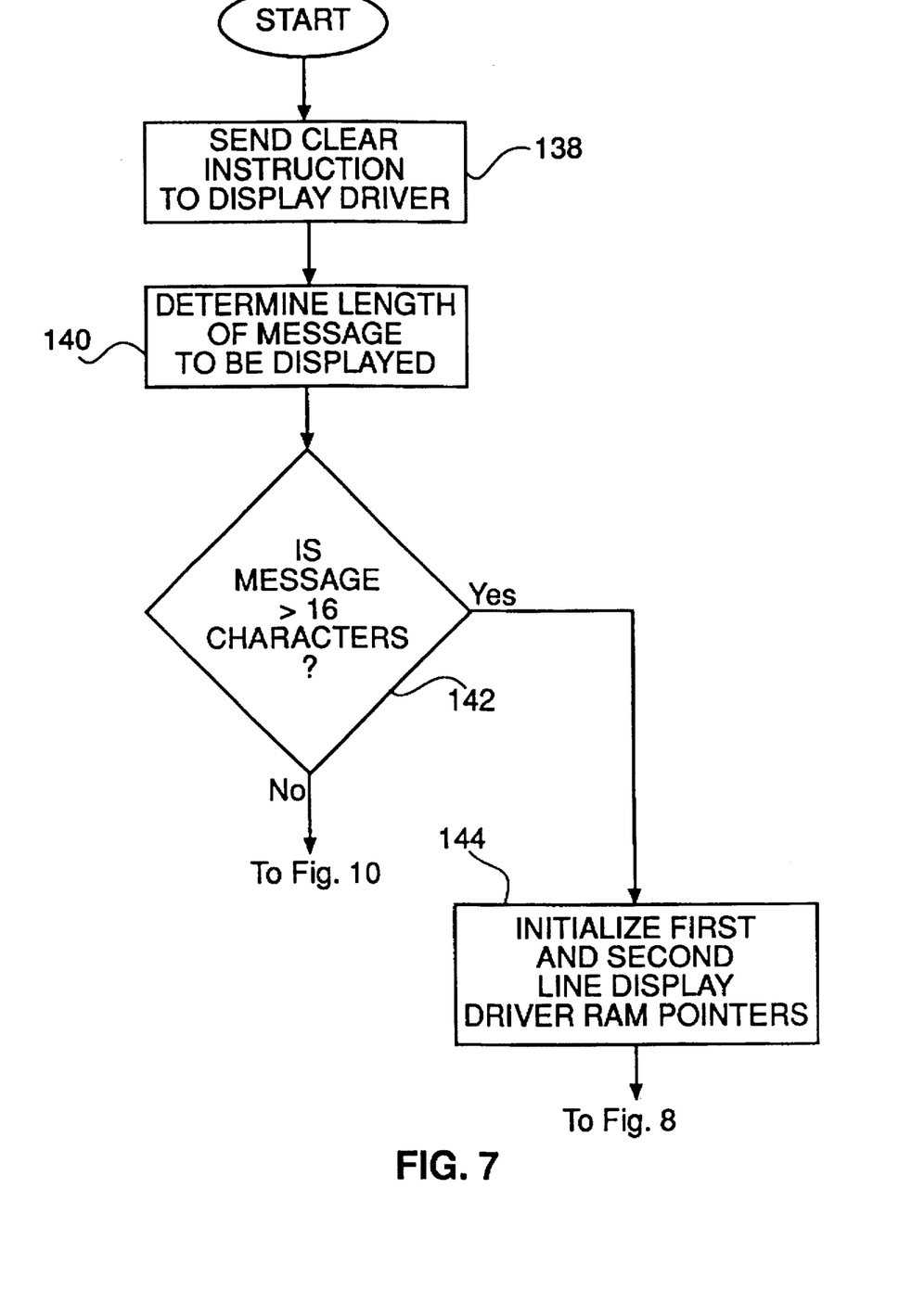
FIGS. 7–10 taken together are a flow diagram of a method for emulating a single line display of a predetermined length with a display driver for driving at least two shorter independent single line displays, according to the present invention.

FIG. 6 is a conceptual drawing of display 86 and memory locations in display driver 14 storing a message for display. For example, assume the message for display is "copyright (C) 1994 by Eastman Kodak Company". Denoted in FIG. 5 are display character positions 94, 96, 98 and 100. Assume that 16 character display 86 can conceptually be divided into two display windows 102 and 104. Display windows 102 and 104 can be thought of as equivalent to display lines 80 and 82 of FIG. 4 being placed side-by-side. Also shown in FIG. 6 are hidden first window characters 106 and hidden second window characters 108. Assume that the message to be displayed is stored in its entirety in a first set of adjacent memory locations in display driver 14, with the contents of the first memory location being that which is shown in display character position 94. Assume also that a truncated version of the message for display is stored in a second area of the display driver memory in a second set of adjacent memory locations. The truncated version of the message for display has an offset at a beginning thereof equal to the number of characters displayed in display window 102, in this case an offset of eight. If the message in display window 102 is scrolled to the left, and simultaneously the message in display window 104 is also scrolled to the left, an observer will see a single coherent 16 character message, even though the observer is actually seeing two versions of the same message, the second version being at an offset with respect to the first. In this manner, display driver 14, which is designed to drive two independent 8 character displays, can be used to emulate a single 16 character display.

FIGS. 7–10 taken together are a flow diagram of a method for emulating a single line display of a predetermined length with a display driver for driving at least two independent single line displays, according to the present invention. The method will be described with reference to the camera 84 of FIG. 5. Initially, display 86 may be cleared as previously described (STEP 138, "SEND CLEAR INSTRUCTION TO DISPLAY DRIVER"). After clearing the display, the length of the message to be displayed is determined (STEP 140, "DETERMINE LENGTH OF MESSAGE TO BE DISPLAYED"). The words in the message for display are stored in the data dictionary of ROM 32 in microprocessor 12. One skilled in the art will know how to determine the length of the message. An inquiry is now made as to whether the message for display is greater than 16 characters in length (INQUIRY 142, "IS MESSAGE>16 CHARACTERS?").

If the message is greater than 16 characters in length, then the pointers in microprocessor 12 pointing to the first and second lines of RAM in display driver 14 are initialized to point to the RAM locations corresponding to the first display position in the first and second display windows (STEP 144, "INITIALIZE FIRST AND SECOND LINE DISPLAY DRIVER RAM POINTERS"). After initializing the first and second line pointers, the message pointer is set to the first number representing the first word in the data dictionary that is in the message for display (STEP 146 in FIG. 8, "SET MESSAGE POINTER TO FIRST NUMBER REPRESENTING FIRST WORD IN MESSAGE"). The word corresponding to the number pointed to by the message pointer is then retrieved from the data dictionary stored in ROM 32 of microprocessor 12 (STEP 148, "FIND WORD IN ROM DATA DICTIONARY"). After finding the word in the data dictionary, the character pointer is set to the memory location of the first character in the word that was found (STEP 150, "SET CHARACTER POINTER TO FIRST CHARACTER IN WORD"). After setting the character pointer, the character pointed to is written to the first line of the display driver RAM (STEP 152, "WRITE CHARACTER TO FIRST LINE OF DISPLAY DRIVER RAM"). An inquiry is then made as to whether the character just written is in the display window of the first line of the display driver RAM (INQUIRY 154, "IS CHARACTER IN FIRST LINE DISPLAY WINDOW?"). If the character is not in the first line display window, the same character is written to the second line of the display driver RAM (STEP 156, "WRITE SAME CHARACTER TO SECOND LINE OF DISPLAY DRIVER RAM"). After writing the character to the second line, both the first and second line display driver RAM pointers are incremented (STEP 158, "INCREMENT FIRST AND SECOND LINE DISPLAY DRIVER RAM POINTERS"). If the character written in STEP 152 is in the first line display window, the first line display driver RAM pointer is incremented (STEP 160, "INCREMENT FIRST LINE DISPLAY DRIVER RAM POINTER"). After either step 158 or 160, the character pointer is incremented (STEP 162, "INCREMENT CHARACTER POINTER"). An inquiry is then made as to whether the end of the current word has been reached (INQUIRY 164, "END OF WORD?"). If the end of the current word has not been reached, the method returns to step 114.

Figure 8:
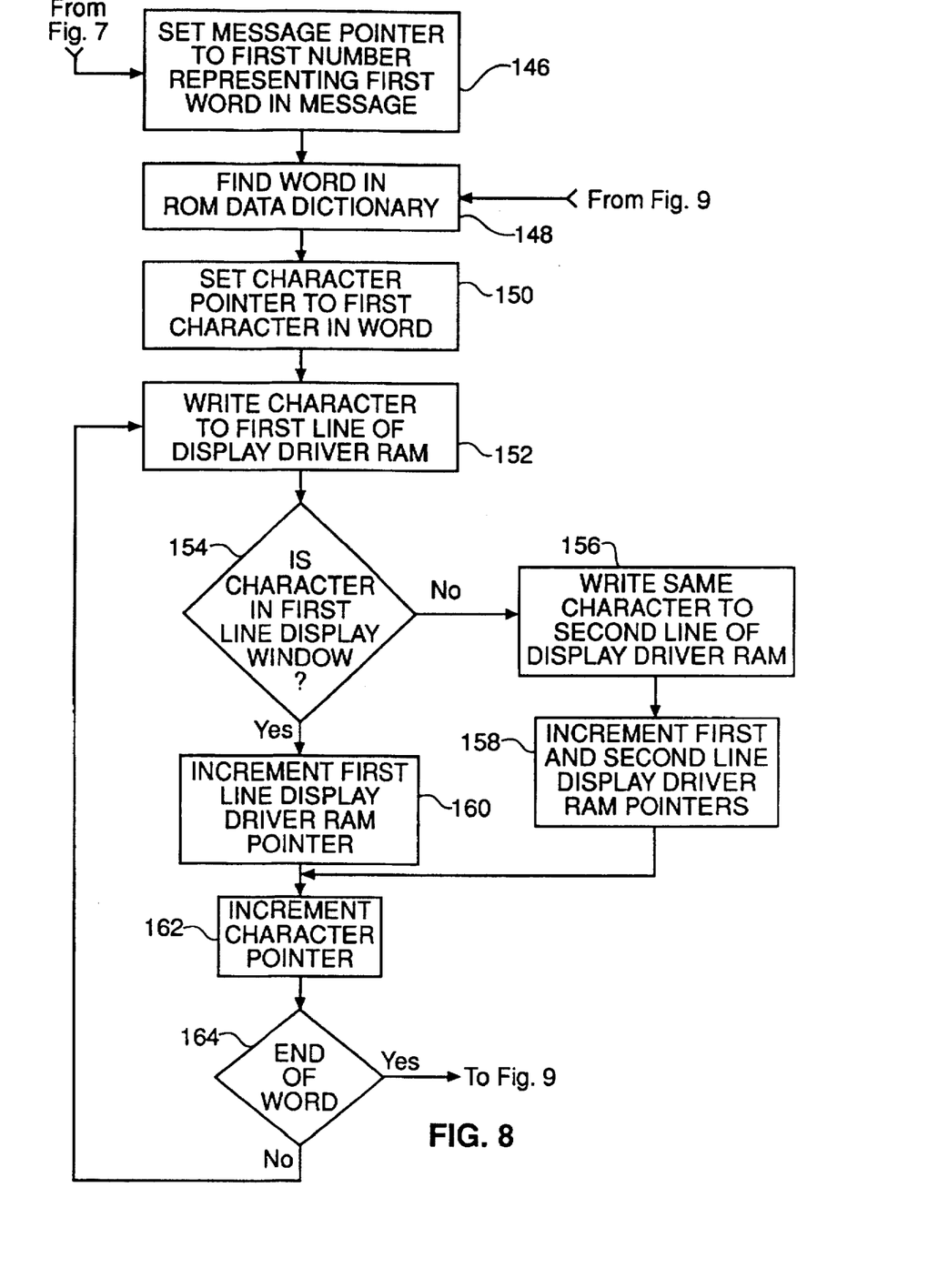
Figure 9:
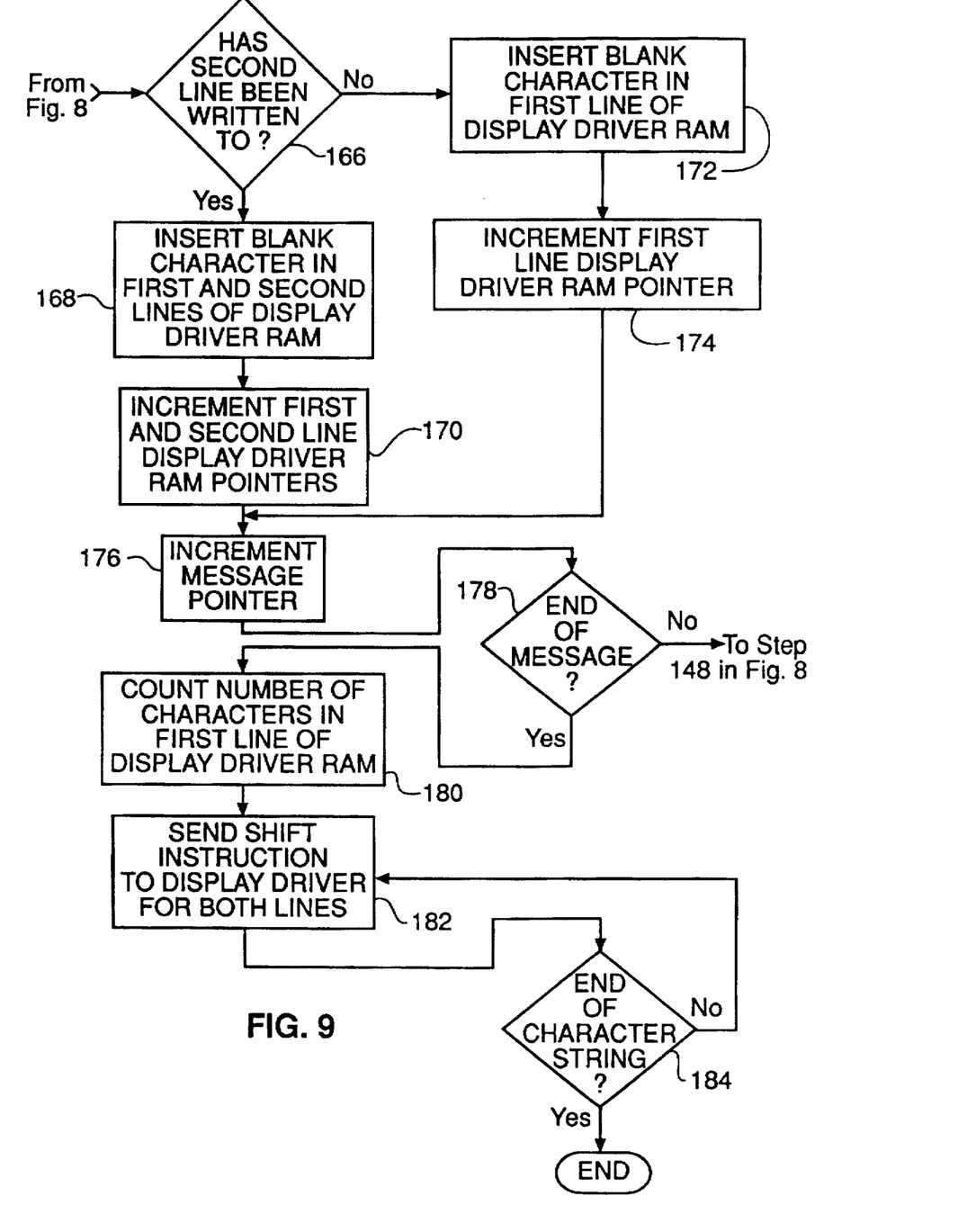

If the end of the current word has been reached, an inquiry is made in FIG. 9 as to whether the second line in the display driver RAM has been written to, in order to determine whether a blank character should be inserted in the first line or both the first and second line (INQUIRY 166, "HAS SECOND LINE BEEN WRITTEN TO?"). If the second line has been written to, a blank character is inserted in both the first and second lines of the display driver RAM (STEP 168, "INSERT BLANK CHARACTER IN FIRST AND SECOND LINES OF DISPLAY DRIVER RAM"). After inserting a blank character in both the first and second lines, the first and second line display driver RAM pointers are both incremented (STEP 170, "INCREMENT FIRST AND SECOND LINE DISPLAY DRIVER RAM POINTERS"). If the second line has not been written to (inquiry 166), a blank character is inserted in the first line only of the display driver RAM (STEP 172, "INSERT BLANK CHARACTER IN FIRST LINE OF DISPLAY DRIVER RAM"). After inserting the blank character in the first line, the first line display driver RAM pointer is also incremented (STEP 174, "INCREMENT FIRST LINE DISPLAY DRIVER RAM POINTER"). After inserting a blank character in either the first line or both the first line and second line, the message pointer is incremented to point to the next number representing the next word in the message for display (STEP 176, "INCREMENT MESSAGE POINTER"). After incrementing the message pointer, an inquiry is made as to whether the end of the message has been reached (INQUIRY 178, "END OF MESSAGE?"). If the end of the message has not been reached, the method returns to step 148 in FIG. 8. If the end of the message has been reached, the number of characters that have been written to the first line of the display driver RAM are counted (STEP 180, "COUNT NUMBER OF CHARACTERS IN FIRST LINE OF DISPLAY DRIVER RAM"). Alternatively, since the length of the message to be displayed was determined in step 140, step 180 could be eliminated if the length of the message to be displayed was saved. After counting the number of characters in the first line, an instruction is sent from microprocessor 12 to display driver 14 causing the display driver to shift both the first and second lines (STEP 182, "SEND SHIFT INSTRUCTION TO DISPLAY DRIVER FOR BOTH LINES"). Since the language of the present example is English, the shift instruction would be to shift left. After sending the shift instruction, an inquiry is made as to whether the end of the character string in the first line of the display driver RAM has been reached (INQUIRY 184, "END OF CHARACTER STRING?"). If the end of the character string has not been reached, the method returns to step 182, and this process is repeated until the last character in the first line of the display driver RAM has shifted beyond the first display window. Although this also causes a shifting of the second line of the display driver RAM beyond the end of the truncated message stored therein, a user will not see anything displayed in the second display window. If the end of the character string has been reached, the method ends.

Figure 10:
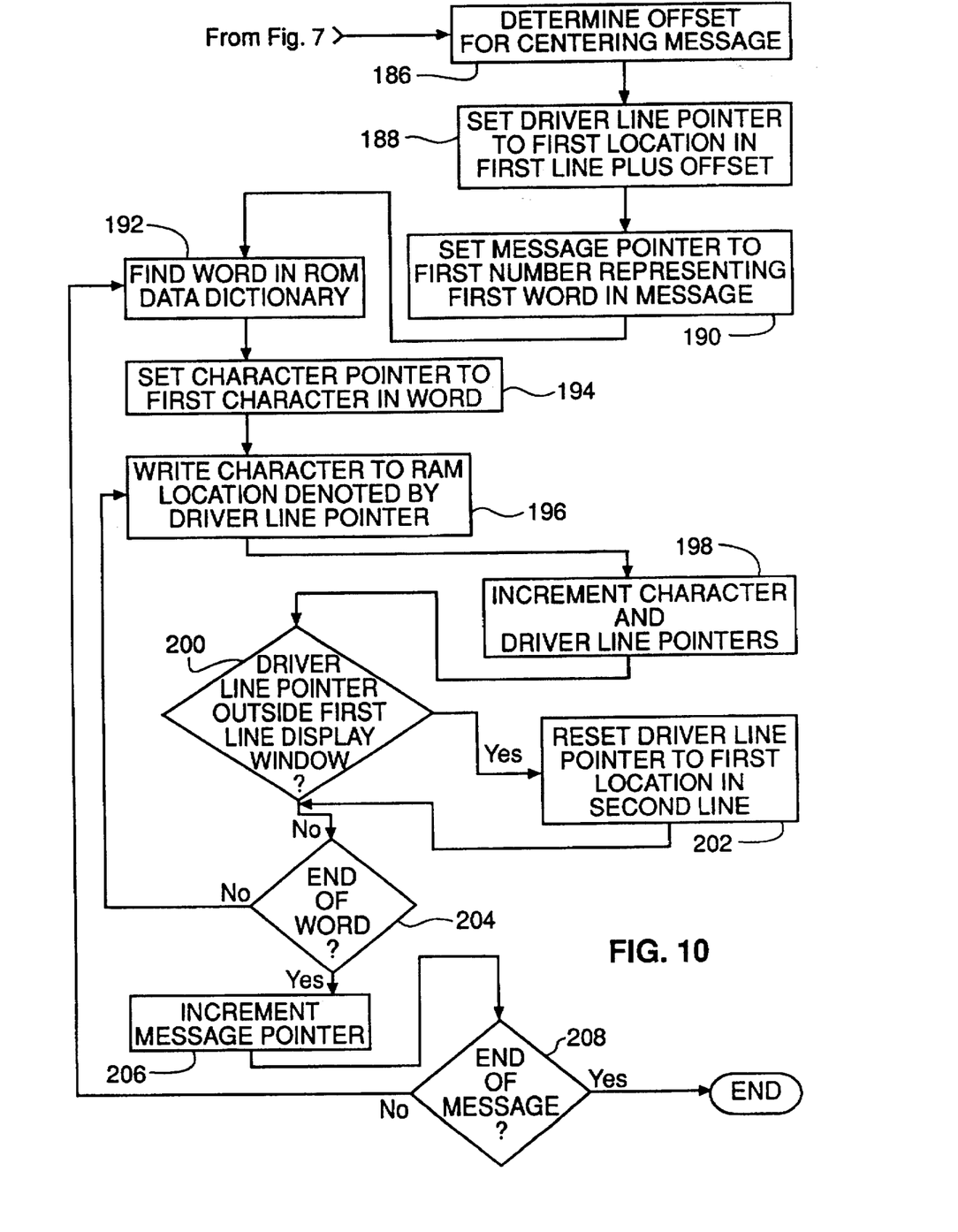

If it is determined in step 142 of FIG. 8 that the message is less than or equal to 16 characters, the method proceeds to FIG. 10 and an offset for preferably centering the message in display 86 of camera 84 is determined (STEP 186, "DETERMINE OFFSET FOR CENTERING MESSAGE"). Although the message is preferably centered in the display, the message could, for example, be left or right justified. The offset for centering may be determined by subtracting the number of characters in the message from the number of characters capable of simultaneous display in display 86, in this case 16, giving the number of display locations not used by the message. The number of display locations not used may then be divided by 2, with the result rounded down to an integer, providing the offset. After determining the offset, a driver line pointer is set to the first location in the first line of the display driver RAM plus the offset (STEP 188, "SET DRIVER LINE POINTER TO FIRST-LOCATION IN FIRST LINE PLUS OFFSET"). After setting the driver line pointer, the message pointer is set to the first number representing the first word in the message for display (STEP 190, "SET MESSAGE POINTER TO FIRST NUMBER REPRESENTING FIRST WORD IN MESSAGE"). After setting the message pointer, the word in the ROM data dictionary represented by the number pointed to by the message pointer is found (STEP 192, "FIND WORD IN ROM DATA DICTIONARY"). After the word is found, the character pointer is set to the memory location of the first character in the word (STEP 194, "SET CHARACTER POINTER TO FIRST CHARACTER IN WORD"). After the character pointer is set, the character pointed to thereby is written to the RAM location denoted by the driver line pointer (STEP 196, "WRITE CHARACTER TO RAM LOCATION DENOTED BY DRIVER LINE POINTER"). After writing the character, the character and driver line pointers are incremented (STEP 198, "INCREMENT CHARACTER AND DRIVER LINE POINTERS"). An inquiry is then made as to whether the driver line pointer is pointing to a location outside the first line display window, either in the first line beyond the display window or in the second line of the display driver RAM (INQUIRY 200, "DRIVER LINE POINTER OUTSIDE FIRST LINE DISPLAY WINDOW?"). If the driver line pointer is outside the first line display window, the driver line pointer is reset to the first location in the second line of the display driver RAM (STEP 202, "RESET DRIVER LINE POINTER TO FIRST LOCATION IN SECOND LINE"). Whether or not the driver line pointer is outside the first line display window, an inquiry is made as to whether the end of the current word has been reached (INQUIRY 204, "END OF WORD?"). If the end of the current word has not been reached, the method returns to step 196. If the end of the current word has been reached, the message pointer is incremented to point to the next number representing the next word in the message for display (STEP 206, "INCREMENT MESSAGE POINTER"). An inquiry is then made as to whether the end of the message has been reached (INQUIRY 208, "END OF MESSAGE?"). If the end of the message has not been reached, the method returns to step 192. If the end of the message has been reached, the method ends.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:

1. A method for emulating a single line display of a predetermined length with a display driver for driving at least two independent single line displays, said display driver including a memory for storing at least two messages for display on said at least two independent single line displays, each of said at least two independent single line displays having a length less than said predetermined length, said method comprising steps of:
- providing a single line display of said predetermined length;
- storing a message for display in said memory;
- displaying as much of said message for display as will fit in a first part of said single line display of said predetermined length; and
- displaying as much of a truncated version of said message for display as will fit in a second part of said single line display of said predetermined length adjacent said first part, said truncated version having an offset at a beginning of said message for display equal to a length of said first part, said display driver driving said single line display of said predetermined length.

2. The method of claim 1, wherein said message for display has a length longer than said predetermined length, and wherein said step of storing comprises steps of:
- storing said message for display in a first area of said memory; and
- storing a truncated version of said message for display in a second area of said memory.

3. The method of claim 1, further comprising steps of:
- scrolling in said first part said message for display; and
- scrolling in said second part said truncated version of said message for display.

4. The method of claim 1, wherein said message for display has a length less than said predetermined length, and wherein said steps of displaying are performed such that said message for display is centered in said single line display of said predetermined length.

5. The method of claim 1, wherein said first part of said single line display of said predetermined length comprises a first half thereof, and wherein said second part of said single line display of said predetermined length comprises a second half thereof.

6. A method for emulating a single line display of a predetermined length with a display driver for driving at least two independent single line displays, said display driver including a memory for storing at least two messages for display on said at least two independent single line displays, said at least two independent single line displays including a first display and a second display, each of said first display and said second display having a length less than said predetermined length, said method comprising steps of:
- providing a single line display of said predetermined length;
- storing a message for display in a first plurality of locations in said memory, said message for display having a length greater than said predetermined length;
- storing a truncated version of said message for display in a second plurality of locations in said memory, said truncated version having an offset at a beginning of said message for display equal to a length of said first display;
- displaying as much of said message for display stored in said first plurality of locations as possible in a first portion of said single line display of said predetermined length, said first portion having a length equal to said length of said first display;
- displaying as much of said truncated version stored in said second plurality of locations as possible in a second portion of said single line display of said predetermined length, said second portion having a length equal to said length of said second display;
- scrolling in said first portion said message for display stored in said first plurality of locations; and
- scrolling in said second portion said truncated version stored in said second plurality of locations.

7. The method of claim 6, wherein said display driver includes a plurality of pointers for pointing to a plurality of locations in said memory, wherein said first step of storing comprises storing said message for display in a first plurality of adjacent locations in said memory, wherein said second step of storing comprises storing said truncated version in a second plurality of adjacent locations, wherein said first step of displaying and said first step of scrolling each comprises incrementally pointing to said first plurality of locations, and wherein said second step of displaying and said second step of scrolling each comprises incrementally pointing to said second plurality of locations.

8. Apparatus for emulating a single line display of a predetermined length, comprising:
- a single line display of said predetermined length; and
- a display driver for driving at least two independent single line displays, each of said at least two independent single line displays having a length less than said predetermined length, said display driver comprising:
  - a memory for storing at least two messages for display,
  - means for storing a message for display in said memory,
  - means for causing said single line display of said predetermined length to display as much of said message for display as will fit in a first part thereof, and
  - means for causing said single line display of said predetermined length to display as much of a truncated version of said message for display as will fit in a second part thereof, wherein said truncated version has an offset at a beginning of said message for display equal to a length of said first part.

9. The apparatus of claim 8, wherein said message for display has a length longer than said predetermined length, wherein said memory comprises a first area and a second area, wherein said means for storing comprises means for storing said message for display in said first area and means for storing a truncated version of said message for display in said second area.

10. The apparatus of claim 8, further comprising:
- means for scrolling in said first part said message for display; and
- means for scrolling in said second part said truncated version of said message for display.

11. The apparatus of claim 10, wherein said apparatus is housed in a camera.

12. The apparatus of claim 8, wherein said message for display has a length less than said predetermined length, and wherein each of said means for causing comprises means for centering said message for display in said single line display of said predetermined length.

13. The apparatus of claim 8, wherein said first means for causing comprises means for causing display in a first half of said single line display of said predetermined length, and wherein said second means for causing comprises means for causing display in a second half of said single line display of said predetermined length.

14. The apparatus of claim 8, wherein said apparatus is housed within a camera.

15. The apparatus of claim 8, wherein said single display of said predetermined length comprises a liquid crystal display.

16. The apparatus of claim 15, wherein said liquid crystal display comprises a 16 character liquid crystal display.

* * * * *